United States Patent
Hashimura

(10) Patent No.: US 8,313,599 B2
(45) Date of Patent: Nov. 20, 2012

(54) METHOD OF MANUFACTURING UNVULCANIZED TIRE

(75) Inventor: Yoshiaki Hashimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/142,980

(22) PCT Filed: Jan. 8, 2010

(86) PCT No.: PCT/JP2010/050165
§ 371 (c)(1),
(2), (4) Date: Jun. 30, 2011

(87) PCT Pub. No.: WO2010/082544
PCT Pub. Date: Jul. 22, 2010

(65) Prior Publication Data
US 2011/0265937 A1    Nov. 3, 2011

(30) Foreign Application Priority Data
Jan. 13, 2009   (JP) .................................. 2009-004601

(51) Int. Cl.
*B29D 30/28*     (2006.01)
(52) U.S. Cl. ........ 156/133; 152/510; 156/123; 156/407; 156/417
(58) Field of Classification Search .................. 156/117, 156/123, 126, 130.3, 133, 397, 406.6, 407, 156/408, 417, 421.6, 421.8; 152/510
See application file for complete search history.

(56) References Cited

U.S. PATENT DOCUMENTS

| | | | | |
|---|---|---|---|---|
| 1,516,290 A | * | 11/1924 | Grove | 156/408 |
| 1,536,723 A | * | 5/1925 | Neal et al. | 156/132 |
| 4,268,330 A | * | 5/1981 | Komatsu et al. | 156/111 |
| 7,704,343 B2 | | 4/2010 | Kanenari | |
| 2008/0093012 A1 | | 4/2008 | Hashimura | |

FOREIGN PATENT DOCUMENTS

| | | |
|---|---|---|
| JP | 56-137947 A | 10/1981 |
| JP | 2001-219478 A | 8/2001 |
| JP | 2006-082332 A | 3/2006 |
| JP | 2007-320129 A | 12/2007 |
| WO | 2005/007392 A1 | 1/2005 |

OTHER PUBLICATIONS

Machine translation of JP 2007-320129-A, patent document published Dec. 13, 2007.*

* cited by examiner

*Primary Examiner* — Geoffrey L Knable
(74) *Attorney, Agent, or Firm* — Carrier Blackman & Associates, P.C.; William D. Blackman; Joseph P. Carrier

(57) ABSTRACT

Provided is a method of manufacturing an unvulcanized tire, with which formation of air pockets is reduced in adhering a cylindrical film member and an adhesive sheet member to each other by using a forming drum having an expansion/contraction mechanism. In the method, a forming device having a forming drum (1) which has an expandable/contractible outer diameter and a forming roller (2) disposed in parallel to the forming drum (1) is used; a cylindrical film member (3) is wound around the forming drum (1) and the forming roller (2); thereafter, the diameter of the forming drum (1) is expanded whereby the cylindrical film member (3) is tensioned so as to be in close contact with the forming drum (1); and subsequently, an adhesive sheet member (4) is supplied and adhered to an outer peripheral surface of the cylindrical film member (3) on the forming roller (2), while the cylindrical film member (3) is being moved in a circumferential direction by rotating the forming drum (1).

14 Claims, 4 Drawing Sheets

METHOD OF MANUFACTURING UNVULCANIZED TIRE

TECHNICAL FIELD

The present invention relates to a method of manufacturing an unvulcanized tire, and more specifically to a method of manufacturing an unvulcanized tire, with which formation of air pockets is reduced in adhering a cylindrical film member and an adhesive sheet member to each other by using a forming drum having an expansion/contraction mechanism.

BACKGROUND ART

Recently, various uses of a cylindrical film member formed of a thermoplastic resin or the like as an inner liner member of a pneumatic tire have been proposed. An unvulcanized tire is formed in such a way that the cylindrical film member is fitted onto a primary forming drum as described in Patent Document 1, and then an adhesive sheet member formed of an unvulcanized rubber, such as a tie rubber material or a carcass material, is further wound around the outer periphery of the cylindrical film member.

Meanwhile, in the above-described forming drum, multiple plates each having an arc-shaped cross section are generally arranged annularly around a drum axis to form a drum shell. In addition, the forming drum is configured to be capable of expanding/contracting the outer diameter thereof by causing these plates to advance and retreat in a radial direction. Operations in primary forming of an unvulcanized tire are as follows. Specifically, the cylindrical film member is fitted onto such an expandable/contractible forming drum, and an adhesive sheet member of a tie rubber material or the like is further adhered around the outer periphery of the cylindrical film member.

However, in a forming drum 1 having an expansion/contraction mechanism, splices and differences in level are formed on an outer peripheral surface of the forming drum 1 as shown in FIG. 5, because of plates constituting a shell. Hence, there is a problem that, when a cylindrical film member 3 is fitted onto the forming drum 1, the cylindrical film member enters a gap formed on the outer peripheral surface of the forming drum 1 due to a splice or a difference in level between the plates, which results in formation of an air pocket 6. When an adhesive sheet member 4 is adhered with such an air pocket 6 being present, tire failure may occur starting from the air pocket.

PRIOR ART DOCUMENT

Patent Document

Patent Document 1: Japanese patent application Kokai publication No. 2001-219478, paragraphs 0041 to 0043

SUMMARY OF INVENTION

Problem to be Solved by the Invention

An object of the present invention is to solve the above-described problems, and to provide a method of manufacturing an unvulcanized tire, with which formation of air pockets is reduced in adhering a cylindrical film member and an adhesive sheet member to each other by using a forming drum having an expansion/contraction mechanism.

Means for Solving the Problem

A method of manufacturing an unvulcanized tire of the present invention to achieve the above-described object is characterized including: using a forming device having a forming drum and a forming roller disposed in parallel to the forming drum, the forming drum having an expandable/contractible outer diameter; winding a cylindrical film member around the forming drum and the forming roller; thereafter, expanding the diameter of the forming drum whereby the cylindrical film member is tensioned so as to be in close contact with the forming drum; and subsequently, supplying and adhering an adhesive sheet member to an outer peripheral surface of the cylindrical film member on the forming roller, while moving the cylindrical film member in a circumferential direction by rotating the forming drum.

Moreover, the above-described configuration is preferably configured as described in the following (1) to (6).
(1) A compression roller is disposed in such a manner as to face the forming roller, and the adhesive sheet member is adhered to the cylindrical film member by compression bonding between the forming roller and the compression roller.
(2) The cylindrical film member is formed of any one of a thermoplastic resin film formed in a cylindrical shape in advance or a thermoplastic resin film joined to form a cylindrical shape.
(3) The thermoplastic resin film has a storage elasticity of 1 to 500 MPa and a thickness of 0.005 to 3 mm.
(4) The adhesive sheet member is formed of an unvulcanized rubber.
(5) The unvulcanized rubber has a storage elasticity of 0.05 to 5 MPa and a thickness of 0.2 to 5 mm.
(6) The adhesive sheet member is an unvulcanized rubber member having a cord embedded therein.

Effects of the Invention

According to the present invention, a forming device having a forming drum which has an expandable/contractible outer diameter and a forming roller disposed in parallel to the forming drum is used; a cylindrical film member is wound around the forming drum and the forming roller; thereafter, the diameter of the forming drum is expanded whereby the cylindrical film member is tensioned so as to be in close contact with the forming drum; and subsequently, an adhesive sheet member is supplied and adhered to an outer peripheral surface of the cylindrical film member on the forming roller, while the cylindrical film member is being moved in a circumferential direction by rotating the forming drum. Accordingly, even when splices and differences in level are formed between plates forming a shell of the forming drum, formation of air pockets can be reduced because the adhering is conducted on the forming roller, which is separated from the forming drum.

MODES FOR CARRYING OUT THE INVENTION

Figure 1A:
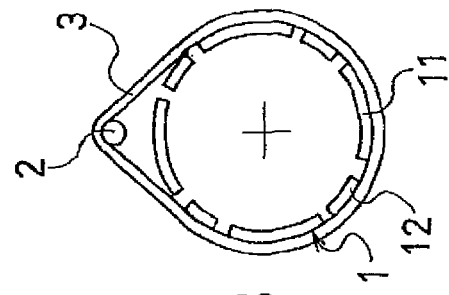
FIGS. 1A to 1G are explanatory diagrams showing an example of steps in a method of manufacturing an unvulcanized tire of the present invention in order of operation.

In a manufacturing process of an unvulcanized tire shown in FIGS. 1A to 1G, reference numeral 1 denotes a forming drum used for primary forming of an unvulcanized tire. The forming drum 1 includes multiple wider plates 11 and multiple narrower plates 12 each having an arc-shaped cross section. The wider plates 11 and the narrower plates 12 are arranged annularly around a drum axis O to from a drum shell. In addition, the multiple plates 11 and 12 are configured to advance and retreat in a radial direction to expand and contract the outer diameter of the drum shell. Outside the forming drum 1, a forming roller 2 is disposed in parallel to the drum axis. As shown in the diagram, the forming roller 2 is movable reciprocally between a position close to the forming drum 1 and a position away from the forming drum 1.

In the method of manufacturing an unvulcanized tire of the present invention, an adhesive sheet member 4 formed of an unvulcanized rubber such as a tie rubber material or a carcass material is adhered, by using such a forming device, to a cylindrical film member 3 formed of a thermoplastic resin or the like through steps shown in FIGS. 1A to 1F.

Figure 1B:
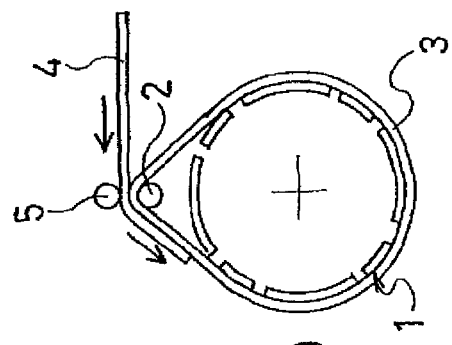
Figure 1C:
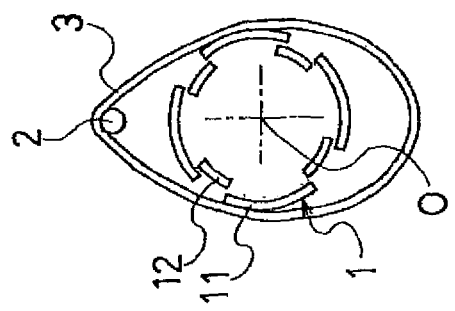
Figure 1D:
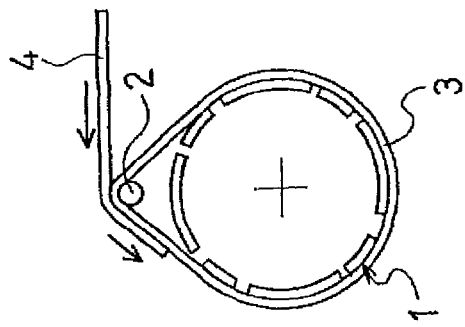

First, as shown in FIG. 1A, the forming drum 1 is set in a contracted-diameter state, and the forming roller 2 is disposed outside. Then, the cylindrical film member 3 is wound around the outsides of the forming drum 1 and the forming roller 2. Next, the diameter of the forming drum 1 is expanded as shown in FIG. 1B to establish a state where the cylindrical film member 3 is tensioned so as to be in close contact with the forming drum 1 and the forming roller 2. Next, as shown in FIG. 1C, while the cylindrical film member 3 is moved in a circumferential direction by rotating at least one of the forming drum 1 and the forming roller 2 by unillustrated driving means, the adhesive sheet member 4 is supplied and adhered to an outer peripheral surface of the cylindrical film member 3 on the forming roller 2. In this event, the adhesive sheet member 4 adheres by its own weight to the outer peripheral surface of the cylindrical film member 3. A compression roller 5 disposed in such a manner as to face the forming roller 2 is brought into pressure contact with the adhesive sheet member 4 as shown in FIG. 1D, so that the adhesive sheet member 4 is adhered to the outer peripheral surface of the cylindrical film member 3 by compression bonding. In such a manner, it is possible to efficiently conduct the stacking without inclusion of air pockets.

Figure 1F:
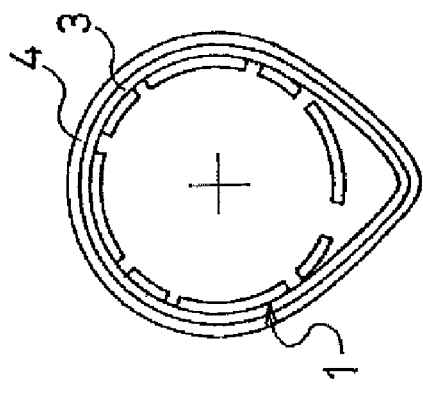
Figure 1E:
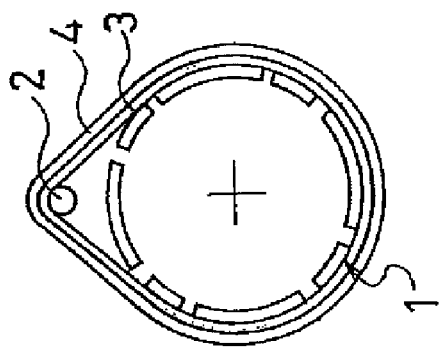
Figure 1G:
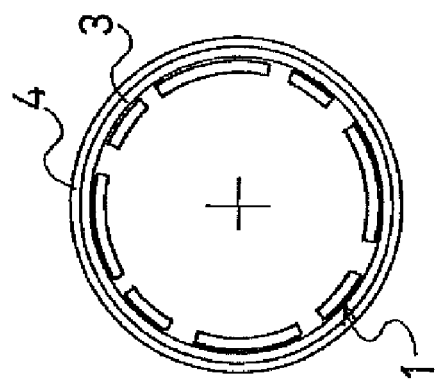

In this way, the adhesive sheet member 4 can be adhered to the entire circumference of the outer peripheral surface of the cylindrical film member 3 as shown in FIG. 1E. After completion of the adhering of the adhesive sheet member 4 to the entire circumference of the cylindrical film member 3, the forming roller 2 is moved in a rotation axis direction, and is pulled out as shown in FIG. 1F. Thereafter, as shown in FIG. 1G, the diameter of the forming drum 1 is further expanded to a desired diameter to complete the step of compression-bonding the cylindrical film member 3 and the adhesive sheet member 4. After this step, in accordance with a known primary forming process, a carcass is mounted on the tire constituent member formed by adhering the cylindrical film member 3 and the adhesive sheet member 4 to each other on the forming drum 1, and then beads are embedded. Thus, a primary green tire can be formed.

According to the above-described method of manufacturing an unvulcanized tire, the cylindrical film member 3 is tensioned so as to be in close contact with the forming drum 1 and the forming roller 2. Accordingly, even when splices or differences in level exist between the plates 11 and 12 forming the shell of the forming drum 1, the adhesive sheet member 4 is adhered to the cylindrical film member 3 on the forming roller 2, which is separated from the forming drum 1. For this reason, it is possible to prevent the formation of air pockets between the cylindrical film member 3 and the adhesive sheet member 4. In addition, the step of bringing the cylindrical film member 3 into close contact with the forming drum 1 and the forming roller 2 can be conducted on the forming drum, and directly thereafter the process of forming a primary green tire can also be conducted on the forming drum. Accordingly, air pockets can be prevented without complicating the operation process, and tire failure can be prevented.

Moreover, even when splices or differences in level exist between the plates forming the shell of the forming drum 1, the formation of air pockets can be prevented. Accordingly, the air pockets can be prevented by only adding the forming roller 2 movable in the rotation axis direction to a conventional expandable/contractible forming drum and without adding another device.

Figure 2:
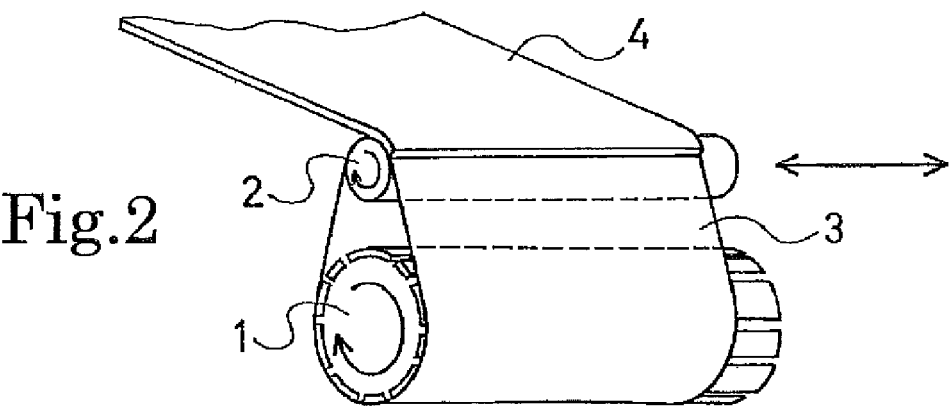
FIG. 2 is a perspective view schematically showing an example of a forming device used in the method of manufacturing an unvulcanized tire of the present invention.
Figure 3:
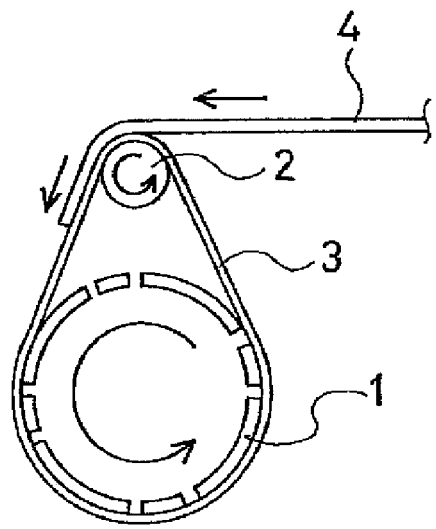
FIG. 3 is a side view of the forming device of FIG. 2.

FIG. 2 is a perspective view schematically showing an example of the step shown in FIG. 1C, and FIG. 3 is a side view thereof. The forming roller 2 is provided in such a manner that the rotation axis thereof can be parallel to that of the expandable/contractible forming drum 1. The cylindrical film member 3 is wound around the forming drum 1 and the forming roller 2, and the diameter of the forming drum 1 is expanded. Thus, the cylindrical film member 3 is tensioned so as to be in close contact with the forming drum 1 and the forming roller 2. In the tensioned state, the adhesive sheet member 4 is adhered to the cylindrical film member 3. The forming roller 2 is movable in the rotation axis direction. The forming roller 2 is introduced at such a position that the forming roller 2 faces the forming drum 1 when the cylindrical film member 3 is wound. The forming roller 2 can be removed when the step of adhering the adhesive sheet member 4 to the cylindrical film member 3 is completed. At least one forming roller 2 is necessary, and multiple forming rollers 2 may be provided.

The forming drum 1, the forming roller 2, and the compression roller 5 can be formed of metal materials, resin materials, or the like. The plates forming the shell of the forming drum 1 as well as the outer peripheral surfaces of the forming roller 2 and the compression roller 5 are flat, and have substantially no splices and substantially no differences in level. Note that there is no problem even if differences in level as small and negligible as 0.5 mm or less exist.

The length of each of the forming drum 1, the forming roller 2, and the compression roller 5 in the axial direction is not particularly limited, and is preferably longer than the width of each of the cylindrical film member 3 and the adhesive sheet member 4, which are to be subjected to the formation. In addition, in order to obtain a good compression bonding state between the cylindrical film member 3 and the adhesive sheet member 4, the outer diameter of the forming drum 1 is preferably set larger than the outer diameter of the forming roller 2.

Figure 4:
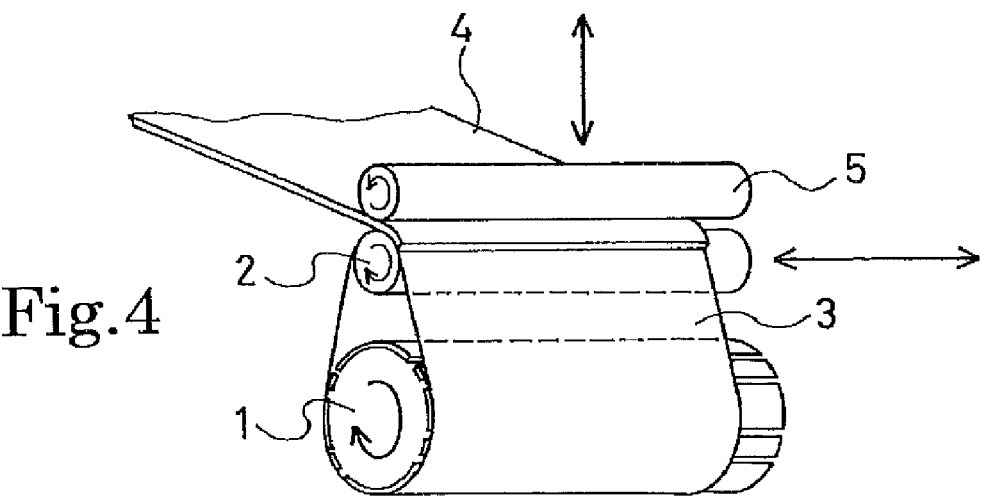
FIG. 4 is a perspective view schematically showing another example of the forming device used in the method of manufacturing an unvulcanized tire of the present invention.
Figure 5:
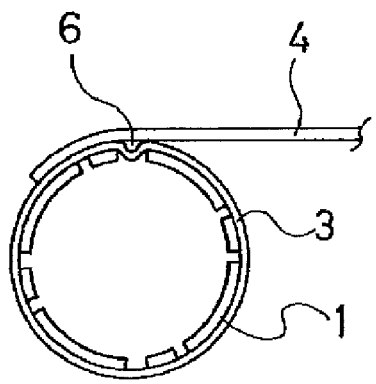
FIG. 5 is a side view showing an example of a forming device used in a conventional method of manufacturing an unvulcanized tire.

In order to obtain a good compression bonding state between the cylindrical film member 3 and the adhesive sheet member 4, the compression roller 5 should be disposed so as to face the forming roller 2 as shown in FIG. 1D and further FIG. 4 in detail so that the adhesive sheet member 4 can be adhered by compression bonding between the forming roller 2 and the compression roller 5. By setting the compression roller 5 in this way, the compression bonding can be carried out without relying on the weight of the adhesive sheet member 4. For this reason, the cylindrical film member 3 and the adhesive sheet member 4 can be compression bonded to each other not only at an upper position on the forming drum 1, but at any position, e.g., at a lower position or a lateral position thereon, as long as the position is around the circumference of the forming drum 1. Not that, not only the compression roller 5 as illustrated, but also a conveyer belt, a simple compression member, or the like may be used, as long as the cylindrical film member 3 and the adhesive sheet member 4 can be compression bonded to each other.

In the present invention, any of a single layer body of a thermoplastic resin film and a multilayer body including at least one thermoplastic resin film layer, which have been cylindrically shaped, can be used as the cylindrical film member 3. This may be formed in a cylindrical shape in advance, or may be joined to form a cylindrical shape. In addition, the thermoplastic resin is not limited to one formed of a thermoplastic resin alone, but may be formed of a thermoplastic elastomer composition obtained by dispersing an elastomer in a thermoplastic resin.

The thermoplastic resin film used as the cylindrical film member 3 preferably has a storage elasticity of 1 to 500 MPa and a thickness of 0.005 to 3 mm, more preferably 0.005 to 1 mm. If the storage elasticity of the thermoplastic resin film is smaller than 1 MPa, the thermoplastic resin film stretches when the forming drum 1, the forming drum 2, and the compression roller 5 are rotated by the driving means. If the storage elasticity is greater than 500 MPa, it becomes hard for the thermoplastic resin film to follow a surface of the forming roller 2 having a small diameter, and to rotate. Meanwhile, if the thickness of the thermoplastic resin film is smaller than 0.005 mm, the cylindrical film member 3 is more likely to be loosened because of reduction in rigidity. A thickness greater than 1 mm causes increase in mass of the tire.

The above-described cylindrical film member 3 is a material to form, for example, an inner liner layer made of a resin-containing film in a vulcanized pneumatic tire.

Meanwhile, an unvulcanized rubber can be used for the adhesive sheet member 4. The unvulcanized rubber preferably has a storage elasticity of 0.05 to 5 MPa and a thickness of 0.2 to 5 mm. If the storage elasticity of the unvulcanized rubber is smaller than 0.05 MPa, the workability deteriorates. Meanwhile, if the thickness of the unvulcanized rubber is smaller than 0.2 mm, the surface of the rubber is so tacky (adhesive), and the rubber is so thin that the handling thereof is difficult. If the thickness is larger than 5 mm, it becomes hard for the unvulcanized rubber to follow the curvature around the forming roller 2 having a small diameter, and differences in level at splices are increased. In addition, an unvulcanized rubber member having a cord embedded therein such as a carcass member may be used for the adhesive sheet member 4.

The adhesive sheet member 4 is a material to form, for example, an inner liner layer, a tie rubber layer, and a carcass layer, which are made of a butyl rubber, in a vulcanized pneumatic tire. In addition, a narrow-width sheet such as a finishing sheet may be adhered to the sheet member 4 in advance.

The adhesive sheet member 4 having the same width as the cylindrical film member 3 may be wound around the outer peripheral surface of the cylindrical film member 3 as illustrated. Alternatively, a strip-shaped adhesive sheet member 4 having a narrower width than the cylindrical film member 3 may be wound around the outer peripheral surface of the cylindrical film member 3 in a spiral manner, or a strip-shaped adhesive sheet member 4 having a narrower width than the cylindrical film member 3 may be wound around a portion of the outer peripheral surface of the cylindrical film member 3.

In addition, the adhesive sheet member 4 may have a greater width than the cylindrical film member 3.

In addition to the above-described thermoplastic resin alone, the thermoplastic resin used in the present invention may be a thermoplastic elastomer composition in which an elastomer is blended into a thermoplastic resin.

Examples of the thermoplastic resin include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 6/6T copolymers, nylon 66/PP copolymers, and nylon 66/PPS copolymers]; polyester-based resins [for example, aromatic polyesters such as polybutylene terephthalate (PBT), polyethylene terephthalate (PET), polyethylene isophthalate (PEI), polybutylene terephthalate/tetramethylene glycol copolymers, PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), methacrylonitrile/styrene copolymers, and methacrylonitrile/styrene/butadiene copolymer]; poly (meth)acrylate-based resin [for example, poly(methyl methacrylate) (PMMA), poly(ethyl methacrylate), ethylene ethyl acrylate copolymer (EEA), ethylene acrylic acid copolymer (EAA), and ethylene methyl acrylate resin (EMA)]; polyvinyl-based resins [for example, vinyl acetate (EVA), polyvinyl alcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methyl acrylate copolymers]; cellulose-based resins [for example, cellulose acetate, and cellulose acetate butyrate]; fluororesins [for example, polyvinylidene fluoride (PVDF), polyvinyl fluoride (PVF), polychlorotrifluoroethylene (PCTFE), and tetrafluoroethylene/ethylene copolymers (ETFE)]; imide-based resins [for example, aromatic polyimide (PI)]; and the like.

Examples of the elastomer used in the present invention include: diene rubbers and their hydrogenated products [for example, NR, IR, epoxidized natural rubbers, SBR, BR (high-cis BR and low-cis BR), NBR, hydrogenated NBR, and hydrogenated SBR]; olefin-based rubbers [for example, ethylene propylene rubbers (EPDM and EPM), and maleic acid-modified ethylene propylene rubber (M-EPM); butyl rubber (IIR); copolymers of isobutylene and aromatic vinyl or diene monomer; acrylic rubber (ACM); ionomers; halogen-containing rubbers [for example, Br-IIR, Cl-IIR, brominated isobutylene para-methylstyrene copolymers (Br-IPMS), chloroprene rubber (CR), hydrin rubber (CHC and CHR), chlorosulfonated polyethylene (CSM), chlorinated polyethylene (CM), and maleic acid-modified chlorinated polyethylene (M-CM)]; silicone rubbers [for example, methyl vinyl silicone rubber, dimethyl silicone rubber, and methyl phenyl vinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene propylene-based rubbers, fluorine-containing silicone-based rubbers, and fluorine-containing phosphazene-based rubbers]; thermoplastic elastomers [for example, styrene-based elastomers, olefin-based elastomers, polyester-based elastomers, urethane-based elastomers, and polyamide-based elastomers]; and the like.

EXAMPLES

By use of forming devices (Conventional Examples 1 and 2 and Examples 1 to 3) having different structures as described below, tire constituent members were formed which were different in kind of cylindrical film member and kind of the adhesive sheet member to be compression bonded onto the cylindrical film member as shown in Table 1. In Conventional Example 1, the forming device was formed of only a forming drum. Conventional Example 2 was an example in which a compression roller was provided to a forming drum. Meanwhile, in Example 1, the forming device was formed of a forming drum and a forming roller. Each of Examples 2 and 3 was an example in which a compression roller was provided in addition to a forming drum and a forming roller.

In each of the examples, thermoplastic resin films were used as the cylindrical film members, and an unvulcanized rubber was used for the adhesive sheet members. However, unvulcanized rubber members having a cord embedded therein were used as the adhesive sheet members in Example 3.

The methods of forming a tire constituent member in these Conventional Examples 1 and 2 and Examples 1 to 3 were evaluated in terms of compression bonding state between the members in the following method. Table 1 also shows the results.

Compression Bonding State between Members:

Twenty units were formed in each of which a cylindrical film member having a width of 300 mm, a thickness of 0.1 mm, and a storage elasticity of 100 MPa was stacked onto an adhesive sheet member having a width of 320 mm, a thickness of 1 mm, and a storage elasticity of 0.5 MPa. The total area of floating portions due to air inclusion was measured. Next, the area ratio of the floating portions due to air inclusion relative to the area where the members were stacked was calculated. Then, an average value of the 20 units was calculated.

o: The area ratio of the floating portions was 1% or less.
x: The area ratio of the floating portions was more than 1%.

Note that, for storage elasticity, a storage elasticity at a static strain of 10%, a dynamic strain of ±2%, a frequency of 20 Hz, and 20° C. was measured by using a viscoelastic spectrometer manufactured by Toyo Seiki Seisaku-sho, Ltd.

|  |  | Conventional Example 1 | Conventional Example 2 | Example 1 | Example 2 | Example 3 |
| --- | --- | --- | --- | --- | --- | --- |
| Cylindrical film member |  | thermoplastic resin film | thermoplastic resin film | thermoplastic resin film | thermoplastic resin film | thermoplastic resin film |
| Adhesive sheet member |  | unvulcanized rubber | unvulcanized rubber | unvulcanized rubber | unvulcanized rubber | unvulcanized rubber member (with cord) |
| Storage elasticity (MPa) | Film member | 100 | 100 | 100 | 100 | 100 |
|  | Sheet member | 0.5 | 0.5 | 0.5 | 0.5 | 0.5 |
| Compression roller |  | absent | present | absent | present | present |
| Forming roller |  | absent | absent | present | present | present |
| Forming drum |  | present | present | present | present | present |
| Compression bonding state between members |  | x | x | o | o | o |

EXPLANATION OF REFERENCE NUMERALS

| 1 | forming drum |
| --- | --- |
| 2 | forming roller |
| 3 | cylindrical film member |
| 4 | adhesive sheet member |
| 5 | compression roller |

What is claimed is:

1. A method of manufacturing an unvulcanized tire, comprising:
    using a forming device having a forming drum having a longitudinal axis and a forming roller disposed outside of the forming drum and having a longitudinal axis disposed in parallel to the longitudinal axis of the forming drum, the forming drum having an expandable/contractible outer diameter;
    placing a cylindrical film member around the forming drum and the forming roller;
    thereafter, expanding the diameter of the forming drum to a first expanded diameter, whereby the cylindrical film member is tensioned so as to be in close contact with the forming drum; and
    subsequently, supplying and adhering an adhesive sheet member to an outer peripheral surface of the cylindrical film member on the forming roller, while moving the cylindrical film member in a circumferential direction by rotating the forming drum.

2. The method of manufacturing an unvulcanized tire according to claim 1, wherein:
    a compression roller is disposed in such a manner as to face the forming roller, and
    the adhesive sheet member is adhered to the cylindrical film member by compression bonding between the forming roller and the compression roller.

3. The method of manufacturing an unvulcanized tire according to claim 1, wherein the cylindrical film member is formed of any one of a thermoplastic resin film formed in a cylindrical shape in advance and a thermoplastic resin film joined to form a cylindrical shape.

4. The method of manufacturing an unvulcanized tire according to claim 3, wherein the thermoplastic resin film has a storage elasticity of 1 to 500 MPa and a thickness of 0.005 to 3 mm.

5. The method of manufacturing an unvulcanized tire according to claim 1, wherein the adhesive sheet member is formed of an unvulcanized rubber.

6. The method of manufacturing an unvulcanized tire according to claim 5, wherein the unvulcanized rubber has a storage elasticity of 0.05 to 5 MPa and a thickness of 0.2 to 5 mm.

7. The method of manufacturing an unvulcanized tire according to claim 5, wherein the adhesive sheet member is an unvulcanized rubber member having a cord embedded therein.

8. The method of manufacturing an unvulcanized tire according to claim 1, further comprising steps of:
- removing the forming roller from the cylindrical film member after the adhesive sheet member has been applied thereto, and
- further expanding the diameter of the forming drum to a second expanded diameter which is larger than the first expanded diameter, thereby compression bonding the cylindrical film member and the adhesive sheet member together.

9. A method of manufacturing an unvulcanized tire, comprising:
- using a forming device having a forming drum having a longitudinal axis and a forming roller having a longitudinal axis disposed in parallel to the longitudinal axis of the forming drum, the forming drum comprising a plurality of wide plates and a plurality of narrow plates, each of said plates having an arcuate cross-sectional shape, said wide plates and narrow plates cooperating to define said forming drum with an expandable/contractible outer diameter;
- installing a film member around the forming drum and the forming roller to provide a cylindrical film member;
- thereafter, expanding the diameter of the forming drum to a first expanded diameter, whereby the cylindrical film member is tensioned so as to be in close contact with the forming drum; and
- subsequently, supplying and adhering an adhesive sheet member to an outer peripheral surface of the cylindrical film member on the forming roller, while keeping the cylindrical film member under tension and moving the cylindrical film member in a circumferential direction by rotating the forming drum, wherein:
- a compression roller is disposed in such a manner as to face the forming roller, and
- the adhesive sheet member is adhered to the cylindrical film member by compression bonding between the forming roller and the compression roller;
- removing the forming roller from the cylindrical film member after the adhesive sheet member has been applied thereto, and
- further expanding the diameter of the forming drum to a second expanded diameter which is larger than the first expanded diameter, thereby compression bonding the cylindrical film member and the adhesive sheet member together.

10. The method of manufacturing an unvulcanized tire according to claim 9, wherein the cylindrical film member is formed of any one of a thermoplastic resin film formed in a cylindrical shape in advance and a thermoplastic resin film joined to form a cylindrical shape.

11. The method of manufacturing an unvulcanized tire according to claim 10, wherein the thermoplastic resin film has a storage elasticity of 1 to 500 Mpa, and a thickness of 0.005 to 3 mm.

12. The method of manufacturing an unvulcanized tire according to claim 9, wherein the adhesive sheet member is formed of an unvulcanized rubber.

13. The method of manufacturing an unvulcanized tire according to claim 12, wherein the unvulcanized rubber has a storage elasticity of 0.05 to 5 MPa and a thickness of 0.2 to 5 mm.

14. The method of manufacturing an unvulcanized tire according to claim 12, wherein the adhesive sheet member is an unvulcanized rubber member having a cord embedded therein.

* * * * *